(12) United States Patent
Drexlmaier et al.

(10) Patent No.: US 6,404,094 B1
(45) Date of Patent: Jun. 11, 2002

(54) HAMMER BRUSH HOLDER ARRANGEMENT WITH STABILIZATION MECHANISM

(75) Inventors: Thomas Drexlmaier, Wuerzburg; Werner Goeb, Kuernach, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/865,674

(22) Filed: May 29, 2001

Related U.S. Application Data

(63) Continuation of application No. PCT/EP99/09077, filed on Nov. 22, 1999.

(30) Foreign Application Priority Data

Nov. 27, 1998 (EP) .............................. 98122519

(51) Int. Cl.[7] ................................. H02K 5/14
(52) U.S. Cl. ........................ 310/239; 310/242
(58) Field of Search ................. 310/239, 244, 310/242

(56) References Cited

U.S. PATENT DOCUMENTS 407,225 A * 7/1889 Loomis ...................... 310/239
5,686,775 A * 11/1997 Veil et al. ................... 310/239
5,753,994 A * 5/1998 Drexlmaier ................. 310/239
5,780,952 A * 7/1998 Lau ............................ 310/239

FOREIGN PATENT DOCUMENTS

| DE | 24 17 028 | 10/1975 | .......... H01R/39/43 |
| DE | 28 14 009 | 10/1979 | .......... H01R/39/39 |
| EP | 0 043 460 | 1/1982 | ............ H02K/5/14 |
| EP | 0 175 993 | 4/1986 | ............ H02K/5/14 |
| EP | 0 791 988 | 8/1997 | .......... H01R/39/39 |

* cited by examiner

Primary Examiner—Karl Tamai
(74) Attorney, Agent, or Firm—Sughrue Mion, PLLC

(57) ABSTRACT

Hammer brush holders (2) are plugged or snapped together as pivoting bearings with cupped bearing receptacles (2.2;2.3) arranged radially on knife-edge bearings (1.2;1.3) of a motor stator part, in particular a bearing bow (1). To prevent tilting due to forces acting perpendicularly to the hammer brush holder's pivotal motion, in particular those arising during assembly and transport, a securing pin (2.1) of the hammer brush holder (2) extends or locks into a securing notch (1.1) of the motor stator part.

13 Claims, 4 Drawing Sheets

HAMMER BRUSH HOLDER ARRANGEMENT WITH STABILIZATION MECHANISM

This is a Continuation of International Application PCT/EP99/09077, with an international filing date of Nov. 22, 1999, which was published under PCT Article 21(2) in German, and the complete disclosure of which is incorporated into this application by reference.

FIELD OF AND BACKGROUND OF THE INVENTION

The invention pertains to a stabilized hammer brush holder arrangement. More particularly, the invention relates to a hammer brush holder arrangement with a tilt-preventing mechanism utilizing a securing pin and a securing notch.

Pivotal bearings for hammer brush holders are disclosed in German patent DE 28 14 009 C3 and European patent EP 0 791 988 A1. The production and assembly process described therein is kept technically simple by providing the plastic hammer brush holder with molded cupped bearing receptacles at the end of the hammer brush holder facing away from the brush. These cupped bearing receptacles are configured to be plugged onto corresponding knife-edge bearings of a motor stator part. The motor stator part is preferably, in particular, a bearing bow. During operation, the brush ends of the hammer brush holder are pressed against the blade surface of a commutator by a pressure springs hooked into notches of the motor stator. In one embodiment, a pivotal bearing provided with individual pivot bearings on each end of the pivot axis thereof are designed in such a way that the hammer can also be locked firmly into position and axially secured by bearing bow stops projecting from between the individual pivot bearings.

A hammer brush holder with a tilt-preventing mechanism comprising a knife-edge bearing, a bearing bow, a securing pin and an additional axial position fixation mechanism is disclosed in German patent DE 24 17 028 A1. In particular, the reference discloses a commutator motor with a pivoting arms to prevent the tilting of the hammer brush holder. The ends of the pivoting arms facing away from the brush lead into diverging furcated lateral edges. These lateral edges form receptacles for a knife-edge bearing provided on a bearing bow. One of these edges has a hook-shaped end, which extends into an opening in the bearing bow. The hook-shaped end of the extension is constructed as an elastic spring that is tensioned to press against one edge of the opening. The width of the hook-shaped end conforms to the width of the hole, thus preventing the pivoting arm from tilting laterally from its operating position.

In addition, a hammer brush holder is disclosed in European patent EP 0 043 460 A in which a front plate and an end plate are provided for the axial fixation of the hammer brush and for securing the hammer brush against radial displacement or jamming.

OBJECTS OF THE INVENTION

One object of the present invention is to employ essentially this same design, which is advantageous in terms of production and assembly, while providing simple means to prevent the tilting caused by potential, externally applied lateral forces, which may arise, in particular, during production and transportation of the component. Such lateral forces, acting perpendicularly to the pivot motion for which the brush holders are designed, may cause the brush holders to be levered out of their pivot positions or placed into a permanent tilting position, with only one end of the brush pressed against the blade surface of the commutator.

SUMMARY OF THE INVENTION

According to one formulation, the invention provides a hammer brush holder arrangement with a tilt-preventing mechanism, including: a motor stator part; a hammer brush holder having a brush and having a pivotal bearing on the motor stator part; a projecting securing pin that engages into an associated securing notch, cupped bearing receptacles pivotally mounted onto knife-edge bearings; and axial securing stops for each of the knife-edge bearings. The projecting securing pin is provided on either the hammer brush holder or the motor stator part, which, in an operational position of the brush holder and the motor stator part. The corresponding securing notch is provided on the other of the motor stator part and the hammer brush holder. Together, the securing pin and the corresponding securing notch limit the tilting of the hammer brush holder in response to any force that acts perpendicularly to the pivotal motion about the pivotal bearing for which the hammer brush holder is designed.

The cupped bearing receptacles are provided either on the hammer brush holder on an end of the hammer brush holder facing away from the brush, or on the motor stator part. These cupped bearing receptacles are preferably located axially on either side of the securing pin, and are pivotally mounted onto at least one corresponding knife-edged bearing, which is provided on either the motor stator part and the hammer brush holder-whichever the cupped bearing receptacles are not provided on. The securing stop for each corresponding knife-edged bearing is preferably form-fitting, position fixating, tongue-shaped, and axially secures the knife-edged bearing.

Thus, it is possible to provide a mechanism for preventing such tilting on the basis of the hammer brush holders described in the Background section above, and having, in addition, the advantageous construction and assembly features presented in the above-recited objects of the invention. This involves a combination of a securing pin on the hammer brush holder and/or on the motor stator part, cooperating with a corresponding securing notch on the motor stator part and/or on the hammer brush holder. In addition, there are knife-edge bearings provided on either side of the securing pin, with tongue-like projecting axial stops associated with the knife-edge bearings, for providing a form-fitting positioning of the cupped bearing receptacles.

The securing pins and securing notches are preferably designed to work together to avoid, when the hammer brush holder and the motor stator part receiving the hammer brush holder are mutually in their operational position, an undesirable over-dimensioning resulting from a very secure interconnection. On the other hand, with the preferred design, if the hammer brush holder begins to tilt at even a small angle, further tilting is prevented because the securing pin runs into the edge of the surrounding securing notches. Once the shear forces that caused the tilting motion (which arise, in particular, nearly exclusively during assembly and transportation of the device) have passed, the hammer brush holder and brushes return automatically into their normal operational positions, preferably due to the spring tension exerted by the brush tension spring.

BRIEF DESCRIPTION OF THE DRAWINGS

The invention and further advantageous refinements of the invention according to the features of the dependent claims are explained in more detail below with the aid of diagrammatic, exemplary embodiments in the drawing, in which:

DETAILED DESCRIPTION OF THE PREFERRED EMBODIMENTS

Figure 3:
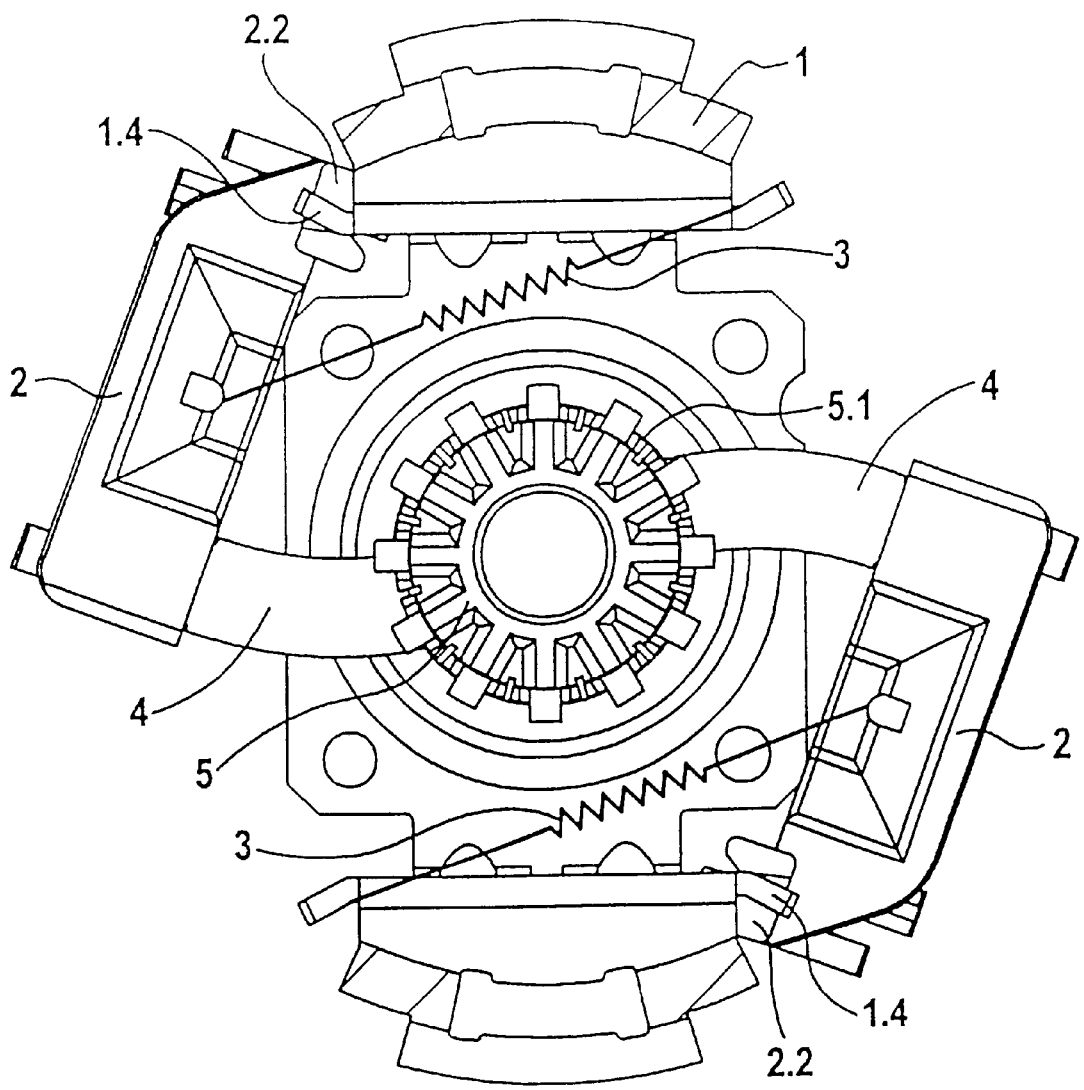
FIG. 3 shows an axial top view of the arrangement inside the motor, in accordance with FIG. 1 but depicted with two hammer brush holders.

As seen in particular in FIG. 3, two radially opposing hammer brush holders 2; 2 are attached to a commutator's bearing bow 1 by being hooked into a pivot bearing. These hammer brush holders 2; 2 are each pressed against a blade surface 5.1 of the commutator 5 by means of a respective brush tension spring 3; 3. Brushes 4; 4 are located on the distal ends of the hammer brush holders, away from the pivot bearing.

In a technically simple assembly process, the hammer brush holder 2 is plugged into the bearing receptacle of the bearing bow 1, to form a mutual pivot bearing. More specifically, the bearing bow 1 is provided with two axially consecutive lateral knife-edge bearings 1.2 and 1.3, which are separated by a securing notch 1.1. The hammer brush holder 2 is plugged, with its cupped bearing receptacles 2.2 and 2.3, respectively onto the knife-edge bearings and then presses against the commutator's blade surface 5.1 through operation of a brush tension spring 3. This holds the hammer brush holder in position, at least radially.

The position of the hammer brush holder 2 relative to the bearing bow 1 is at least partially axially secured by a certain amount of friction from the pivot bearing, caused by the pressure from the brush tension spring 3. However, the invention preferably additionally provides axial, tongue-shaped, projecting stops 1.4 and 1.5 that ensure a form-fitting positional fixation of the hammer brush holder 2. These stops are provided on both exterior sides of the cupped bearing notches 2.2 and 2.3 when they are plugged onto the knife-edge bearings 1.2 and 1.3.

As shown in FIGS. 1–3 and 5–7, the brush holder 2 is provided with a projecting securing pin 2.1. During operation, when the hammer brush holder 2 and the bearing bow 1 are coupled to form the mutual pivot bearing, the securing pin locks into a corresponding notch 1.1 in the bearing bow 1 to secure the hammer brush holder 2 against tilting forces, which for the most part act axially to the above-described pivot motion.

Figure 1:
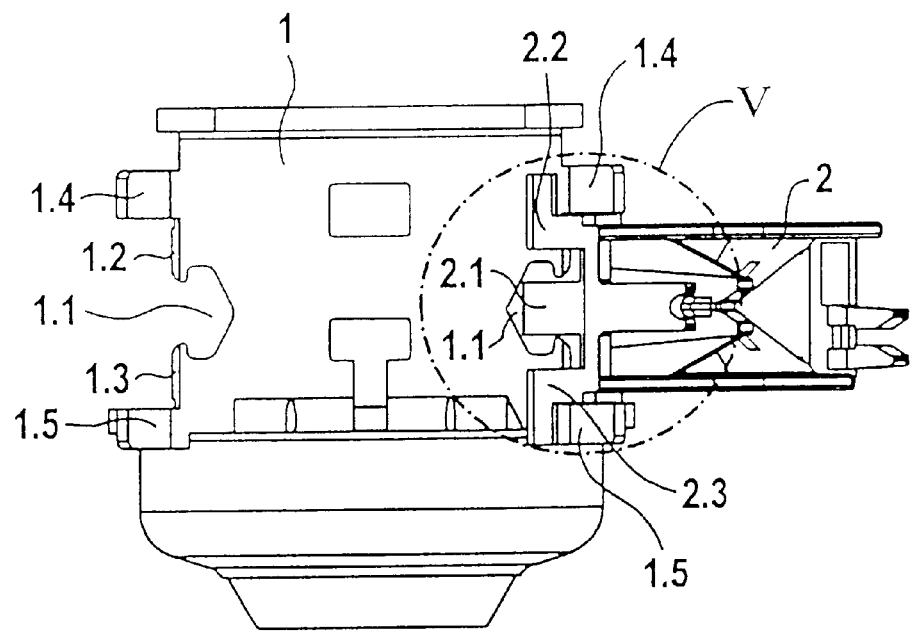
FIG. 1 shows a radial top view of a bearing bow according to the invention, depicting only one plugged-in hammer brush holder, in its normal operating pivot position.
Figure 2:
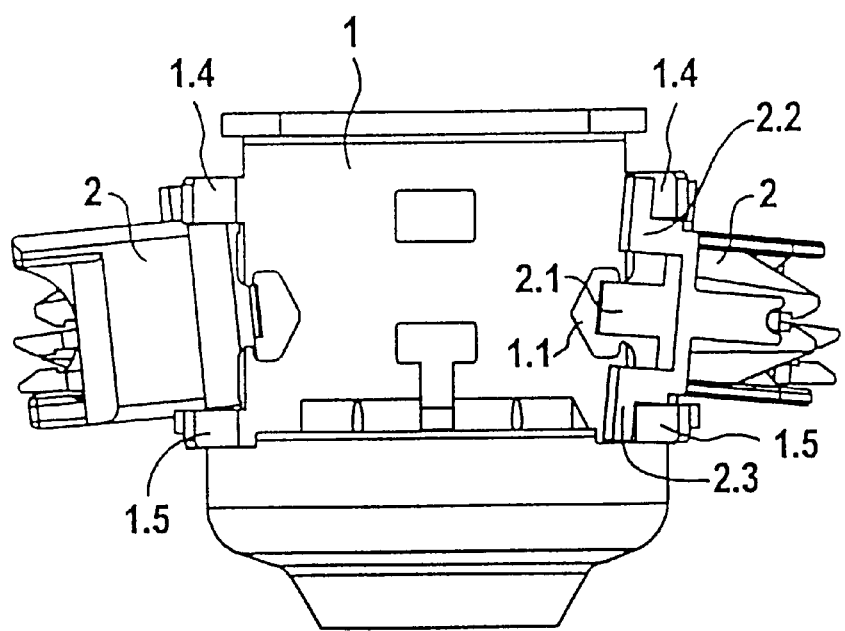
FIG. 2 shows the arrangement in accordance with FIG. 1, with two hammer brush holders depicted in a slightly tilted position, restricted by the tilt-prevention mechanism according to a preferred embodiment of the present invention.

Taking as a basis a normally functioning pivot bearing in accordance with FIG. 1, FIG. 2 shows hammer brush holder 2 at a slightly tilted position, which is restricted by the securing pin 2.1 contacting the upper wall of the securing notch 1.1. If an external force causes the hammer brush holder to tilt temporarily, e.g. during assembly or transport, the effect on the hammer brush holder is nullified by the invention as soon as the external force ceases. Specifically, the hammer brush holder 2 re-adjusts into its normal pivot bearing position by the traction from the brush tension spring 3. Without the tilt-prevention mechanism in accordance with the present invention, there is a possibility that the brush holder would be brought into such a tilted position that there would be a permanent cant between the brush 4 held by the hammer brush holder 2 and the commutator blade surface 5.1, or even a complete separation of the hammer brush holder 2 from its pivot bearing.

In an advantageous manner, the invention retains the simple production and assembly technique provided by conventional plug-in assemblies that utilize a hammer brush holder 2 and a bearing bow 1 hooked together using a brush tension spring 3. However, unlike the conventional art, the invention additionally provides an especially secure and cost-effective tilt-prevention mechanism. As a practical matter, the securing notch 1.1 is preferably also designed and used as a counter-support for hooking in one end of the brush tension spring 3.

The securing pin 2.1 should be adjusted to the size of the securing notch 1.1 in order to prevent the hammer brush holder 2 from tilting at too large an angle yet also to guard against too tight a fit that would result in the need for an overly strong pressing force during assembly. At the same time, the relative dimensioning of the pin and notch should not be so tight that it fails to accommodate the various mutual tolerances of the prefabricated parts that are to be assembled.

Figure 4:
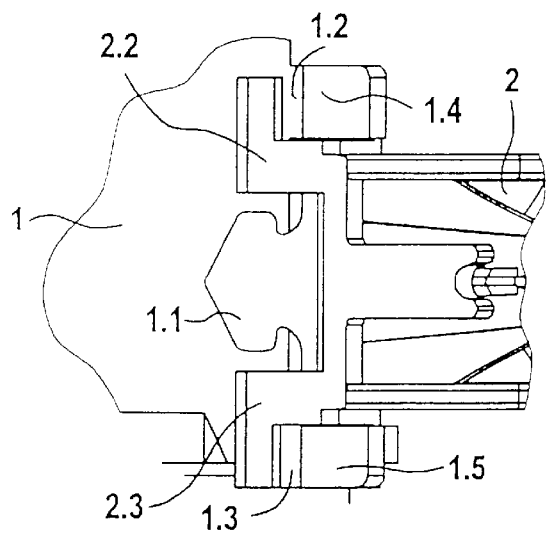
FIG. 4 shows a detail view of a conventional pivot bearing, enlarged from FIG. 1, but without a tilt-prevention mechanism.
Figure 5:
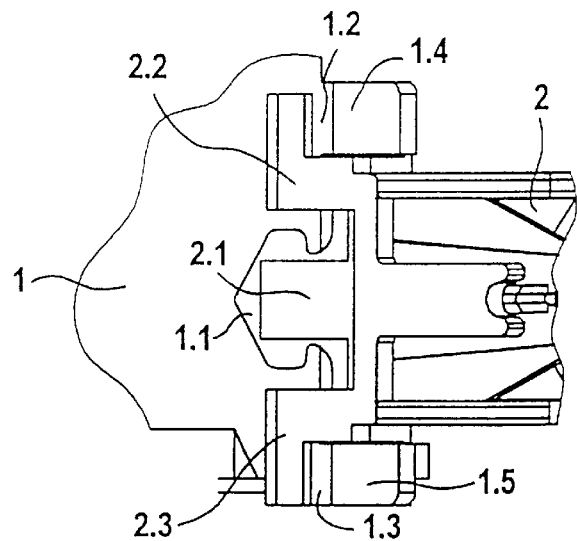
FIGS. 5–8 show further detail enlargements based on FIG. 1, with pivot bearings provided with various embodiments of tilt-prevention mechanisms in accordance with the present invention.
Figure 6:
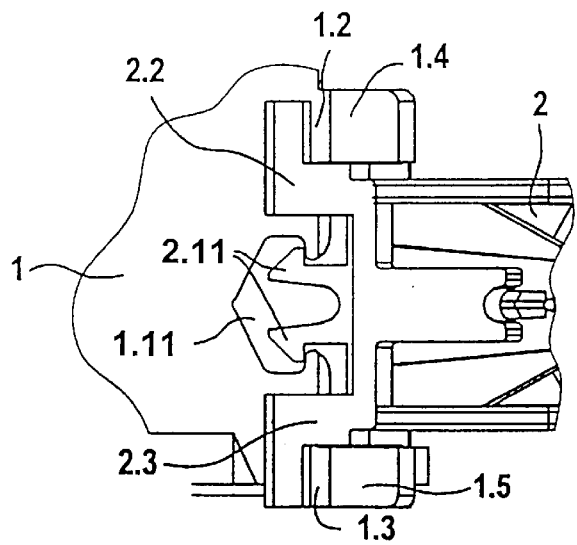
Figure 7:
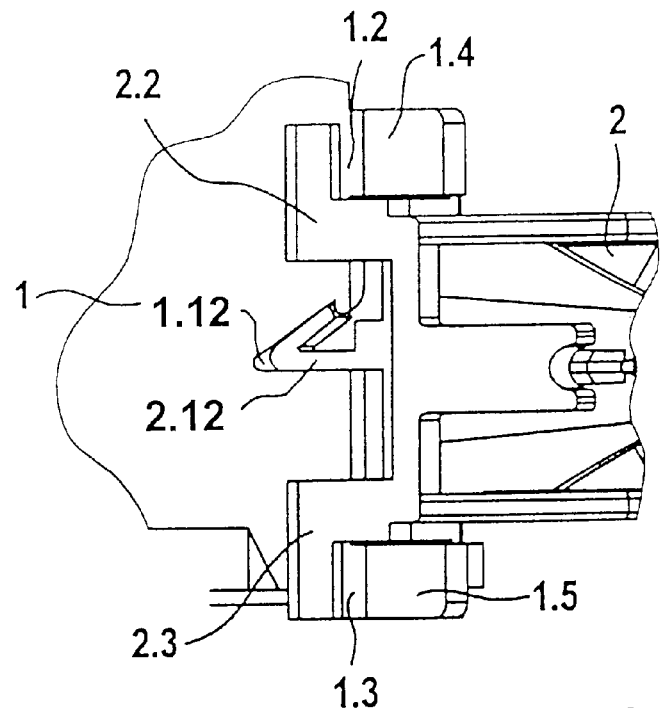
Figure 8:
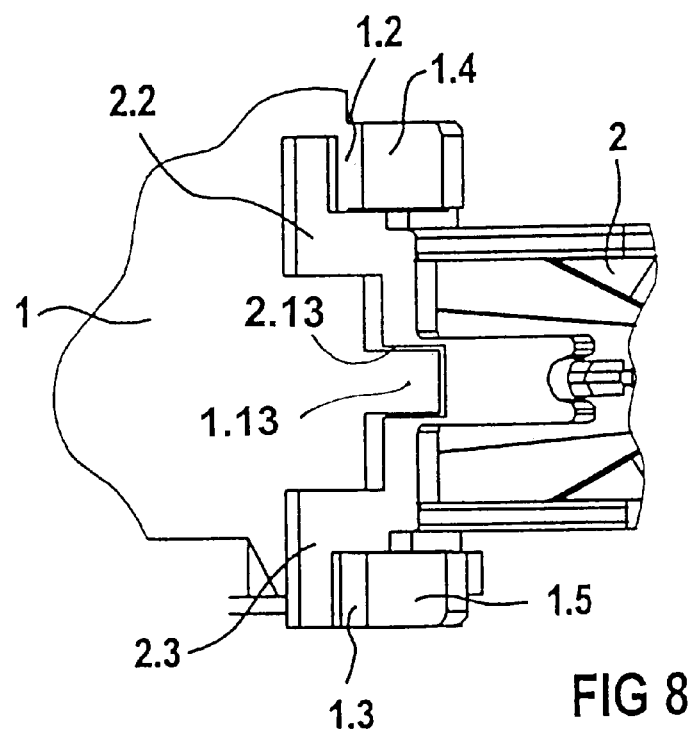

Taking as a basis a conventional pivotal bearing, without the tilt-prevention mechanism, in accordance with FIG. 4, the individual enlargements in FIGS. 5 to 7 show various embodiments of a securing pin on a hammer brush holder 2 locking essentially effortlessly into a securing notch on the bearing bow 1. FIGS. 6 and 7 show two embodiments of a form-fitting, preferably spring-mounted, locked engagement of a securing pin 2.11, 2.12 on the hammer brush holder into a securing notch 1.11, 1.12. In the two embodiments shown, the securing notches 1.11, 1.12 are each complementary to their respective securing pin 2.11, 2.12 and each has a back ridge within the bearing bow 1 for locking the securing pin. FIG. 8 shows a kinematic reversal of FIG. 5, with the securing pin 1.13 of a bearing bow 1 locking into a securing notch 2.13 of a hammer brush holder 2.

In accordance with a technically advantageous manner of production, the securing notch 1.1 and/or the notched bearings 1.2; 1.3 and/or the securing stops 1.4; 1.5 are manufactured as unitary machine-punched and bent parts of the metallic bearing bow 1. The securing pin 2.1 and the cupped bearing receptacles 2.2; 2.3 are formed as one piece components of the hammer brush holder 2, preferably either affixed to or integral with a plastic hammer brush holder, which itself is preferably produced through injection molding.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. Hammer brush holder arrangement with tilt-preventing mechanism, comprising:

a motor stator part;

a hammer brush holder having a brush and having a pivotal bearing on the motor stator part;

a projecting securing pin on at least one of the hammer brush holder and the motor stator part, which, in an operational position of the brush holder and the motor stator part, engages into a corresponding securing notch of at least the other of the motor stator part and the hammer brush holder, so as to at least limit tilting of the hammer brush holder in response to a force that is at least mostly perpendicular to a pivotal motion about the pivotal bearing;

cupped bearing receptacles on at least one of the hammer brush holder on an end of the hammer brush holder facing away from the brush, and the motor stator part, wherein the cupped bearing receptacles are located axially on either side of the securing pin, and wherein the cupped bearing receptacles are pivotally mounted onto at least one corresponding knife-edged bearing of at least the other of the motor stator part and the hammer brush holder; and a form-fitting, position fixating, tongue-shaped, axial securing stop associated with each corresponding knife-edged bearing.

2. Hammer brush holder arrangement according to claim 1, wherein said motor stator part is a bearing bow.

3. Hammer brush holder arrangement according to claim 1, wherein the securing pin is an element molded onto the hammer brush holder.

4. Hammer brush holder arrangement according to claim 3, wherein the securing pin and the hammer brush holder are a single-piece of unitary structure.

5. Hammer brush holder arrangement according to claim 4, wherein the securing pin and the plastic hammer brush holder are injection molded.

6. Hammer brush holder arrangement according to claim 3, wherein the securing notch is fashioned as an orifice in the motor stator part, dimensioned to receive the securing pin.

7. Hammer brush holder arrangement according to claim 6, wherein the securing notch is fashioned by punching out a portion of the motor stator part to form the orifice.

8. Hammer brush holder arrangement according to claim 1, further comprising a brush-tension spring, wherein the securing notch is provided on the motor stator part and provides a counter-support for the brush tension spring.

9. Hammer brush holder arrangement according to claim 1, wherein at least one of the cupped bearing receptacles is provided on the hammer brush holder, and at least one of the corresponding knife-edged bearings is provided on the motor stator part.

10. Hammer brush holder arrangement according to claim 2, wherein at least one of the cupped bearing receptacles is provided on the hammer brush holder, and at least one of the corresponding knife-edged bearings is provided on the bearing bow.

11. Hammer brush holder arrangement according to claim 1, wherein, in an operational position of the brush holder and the motor stator part, the securing pin and the corresponding securing notch are dimensioned with a mutual tolerance that limits the tilting to a degree that ensures a functionally secure connection between the cupped bearing receptacles and the corresponding notched bearings, respectively.

12. Hammer brush holder arrangement according to claim 1, wherein the securing pin and the corresponding securing notch are dimensioned to provide a form-fitting snap-in connection.

13. Hammer brush holder arrangement according to claim 12, wherein the connection is a locking snap-in connection.

* * * * *